July 25, 1967 M. M. TRIPLETT ET AL 3,333,191

ELECTRICAL INSTRUMENT HAVING LIGHT PROJECTED DIGITAL READOUT AND MOVEMENT OPERATED CONTROL ELEMENTS

Filed May 6, 1963 3 Sheets-Sheet 1

INVENTORS
MILO M. TRIPLETT
EUGENE M. BASINGER
BY
Toulmin & Toulmin
ATTORNEYS

July 25, 1967 M. M. TRIPLETT ET AL 3,333,191

ELECTRICAL INSTRUMENT HAVING LIGHT PROJECTED DIGITAL READOUT AND MOVEMENT OPERATED CONTROL ELEMENTS

Filed May 6, 1963 3 Sheets-Sheet 2

INVENTORS
MILO M. TRIPLETT
EUGENE M. BASINGER
BY
Toulmin & Toulmin
ATTORNEYS

INVENTORS
MILO M. TRIPLETT
EUGENE M. BASINGER
BY
Toulmin & Toulmin
ATTORNEYS

1

3,333,191
ELECTRICAL INSTRUMENT HAVING LIGHT PROJECTED DIGITAL READOUT AND MOVEMENT OPERATED CONTROL ELEMENTS

Milo M. Triplett and Eugene M. Basinger, Bluffton, Ohio, assignors to The Triplett Electrical Instrument Co., Bluffton, Ohio Filed May 6, 1963, Ser. No. 278,269
3 Claims. (Cl. 324—96)

This invention relates to meters, particularly to indicating electrical meters and more particularly still to an electric meter having a digital readout.

Electrical instruments of various types, such as those employing D'Arsonval movements or iron vane movements or electrodynamometer movements are, of course, known and usually employ a pointer sweeping over a calibrated dial for indicating the value of the particular condition being measured. The present invention is concerned with meters and instruments of this nature but wherein the dial and pointer are replaced with a digital readout arrangement in which the indicated value is observed on a screen in the form of numbers projected thereon. A particular object of the present invention is the provision of a novel electrical instrument construction of the nature referred to above having a digital readout.

Another object of this invention is the provision of an electrical instrument having a digital readout in which the indicated values are indicated in large numerals so as to be easily discernible from a distance.

Another object of this invention is the provision of an electrical instrument having a digital readout in which the indicated value is projected by light rays on a screen forming a part of the instrument so that the indicated value is readily discernible on account of being illuminated.

Another object of this invention is the provision of an electrical instrument having a screen arrangement on which the measured values are indicated, the said instrument being arranged for panel mounting with only the readout screen and a shield therefor being visible.

Still another object of this invention is the provision of a digital readout electrical instrument having means for projecting the measured value and including a light source in which the light source is so arranged that it does not heat up the instrument movement.

Still another object of this invention is the provision of an electrical instrument having a light operated digital readout system in which the light source for the readout system is disposed outside the instrument so as not to heat up the instrument movement but wherein the instrument is shielded against the ingress of foreign matter.

Another object of this invention is the provision of an instrument having a light operated digital readout system in which the light operates a control mechanism by a light sensing element.

Another object of this invention is the provision of an instrument having a light operated digital readout system in which the light also operates a recording mechanism having an element sensitive to the light.

These and other objects and advantages of this invention will become more apparent upon reference to the

2 following specification taken in connection with the accompanying drawings in which:

Figure 1:
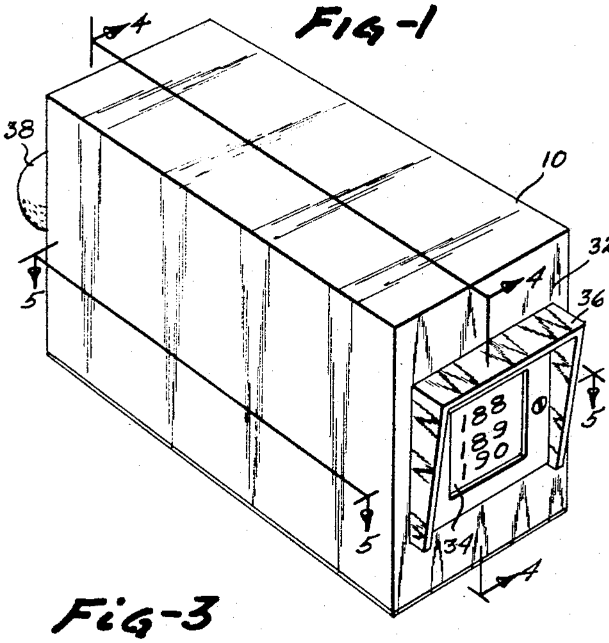
FIGURE 1 is a perspective view looking in toward the front of an instrument according to the present invention.
Figure 2:
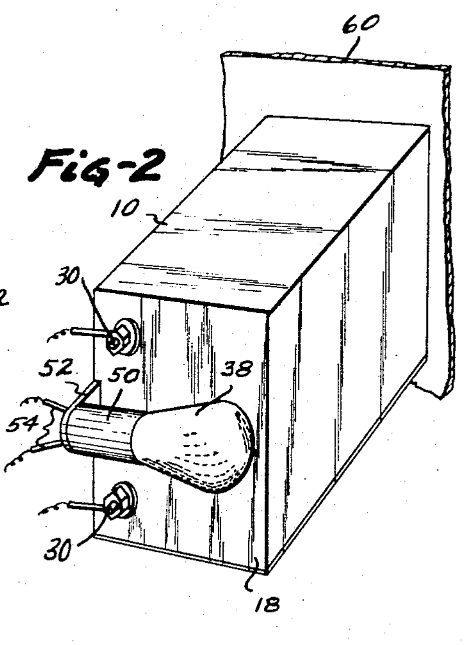
FIGURE 2 is a similar view but taken from the rear of the instrument.

Referring to the drawings somewhat more in detail, and with particular reference to FIGURES 1 through 5, it will be seen that the instrument comprises an outer casing 10, usually insulating material, within which is mounted an instrument movement generally indicated at 12. The particular type of movement employed is not important and it can be a D'Arsonval type movement or an iron vane type movement or an electrodynamometer type movement or any other type of electrical instrument movement capable of actuating pointer assembly 14 which is suspended in the movement with jewels and pivotes or other types of known suspension such as a taut band suspension.

As illustrated in the drawings pointer assembly 14 has a support structure 16 carried thereby and extending toward the back end 18 of the case 10. This support structure supports an arcuate film strip 20 which is printed with characters corresponding to the nature and range of the instrument.

Inasmuch as the support structure 16 and the film strip 20 is a relatively heavy assembly, the pointer assembly 14 includes an arm 22 located opposite the support structure 16 and provided with a movable counterweight 24, which may be a coil of wire, for example.

Figures 3, 4:
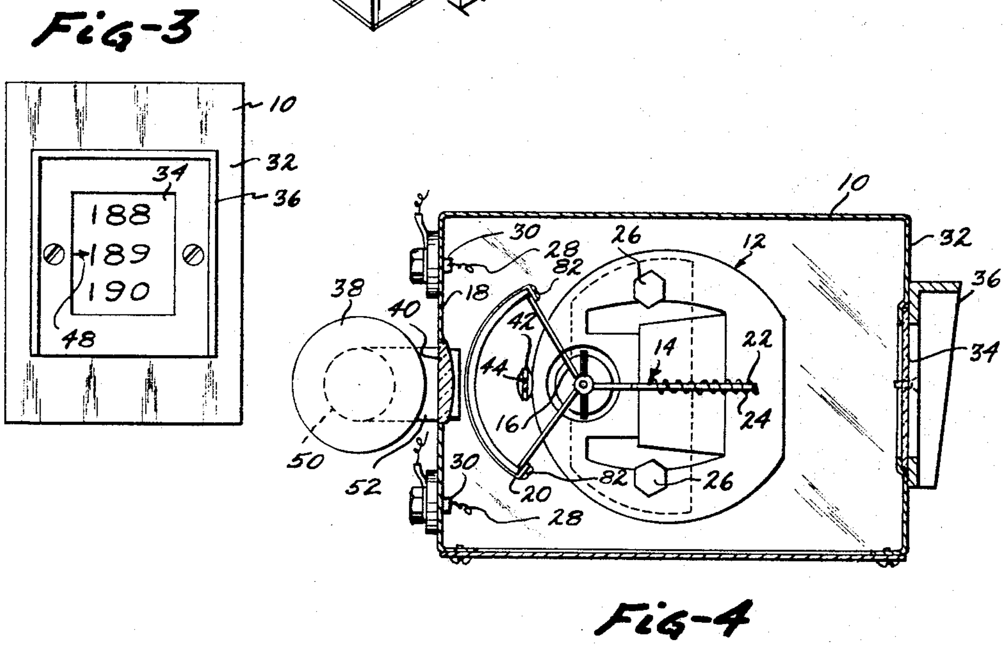
FIGURE 3 is a front elevational view of the instrument showing the appearance of the readout screen.
FIGURE 4 is a vertical longitudinal section taken through the instrument and is indicated by cutting plane 4—4—4 on FIGURE 1.
Figures 5, 6, 7, 9, 10:
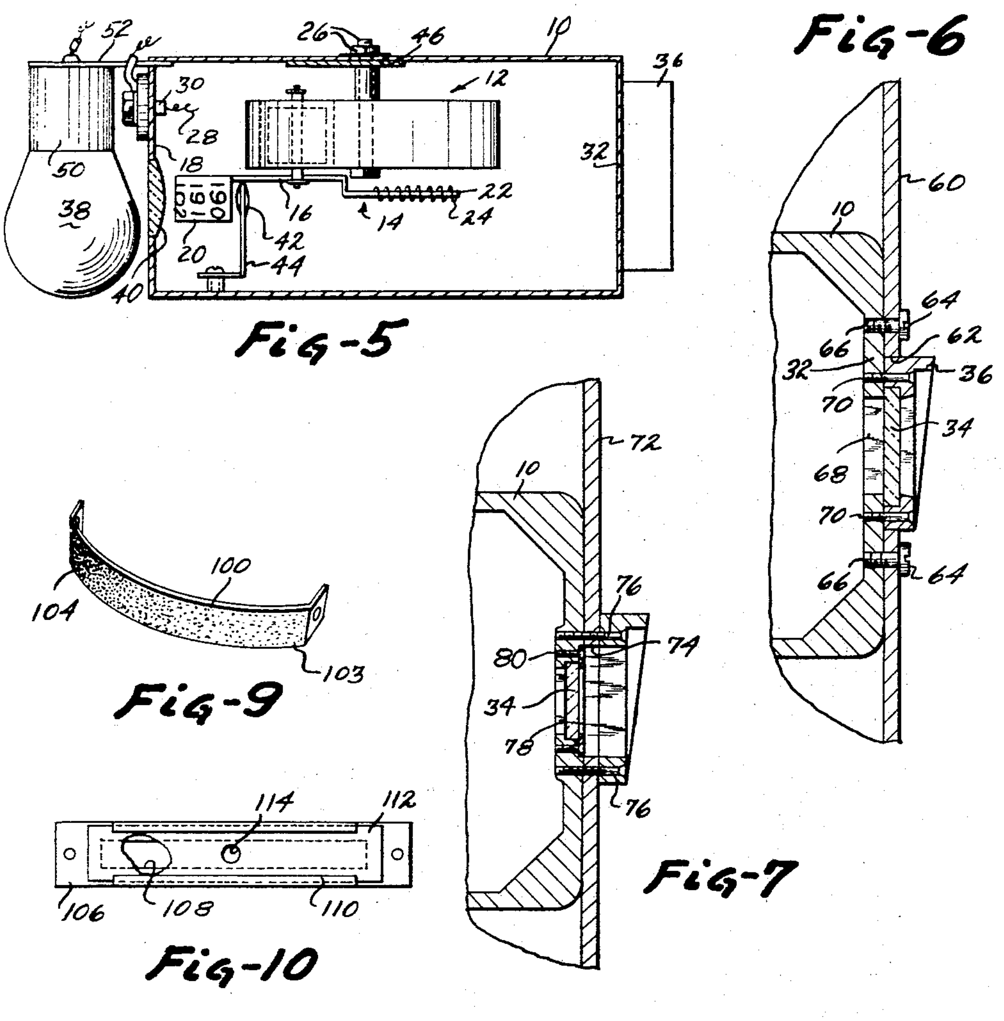
FIGURE 5 is a plan sectional view and is indicated by cutting plane 5—5—5 on FIGURE 1.
FIGURE 6 is a fragmentary vertical section showing one manner of mounting the instrument on a panel.
FIGURE 7 is a view like FIGURE 6 but shows another manner in which the instrument can be mounted on a panel.
FIGURE 9 is a view showing a film strip of varying transparency.
FIGURE 10 is a view showing another type of film strip with a holder.

The instrument movement may be mounted in the case in any suitable manner, such as by the nuts and bolts which will be seen at 26 in FIGURES 4 and 5. The electrical connection to the instrument movement is effected by wires 28 leading to terminal posts 30 which are preferably located in the aforementioned back end wall 18 of casing 10.

According to the present invention the front end wall 32 of the casing includes a screen element 34 which may be a material such as opalescent glass or a plastic material of this same nature. Screen 34 is retained on front wall 32 of the instrument in any suitable manner, such as being clamped thereto by the shield member 36 which is provided for shielding the screen so that light reflection therefrom will not interfere with reading the information on the screen.

The screen is arranged for being illuminated and the digital information projected thereon by a lens and light source system which will be seen in FIGURES 4 and 5. This consists of the light source 38 located behind back wall 18 of the instrument and from which light passes through a condensing lens 40 mounted in back wall 18 of the casing to the film strip 20. The light, after passing through film strip 20, passes through the projection lens 42 and then falls on screen 34. The projection lens 42 is preferably supported on bracket means 44 which includes means for adjusting lens 42 in the space between the film strip and the screen.

If adjustment of the film strip itself is required, this can be accomplished by moving the entire instrument movement in the case as is provided for by the slot means 46 through which the bolts 26 pass. The combination of the adjustments referred to enable sharp, clear images to be projected on screen 34. It will be apparent that the images are considerably larger than the characters printed on the film strip and that the aforementioned adjustments provide means for adjusting the size of the characters on the screen so that they will fall within the limits of the screen.

As will be seen in FIGURE 3, the screen includes a pointer 48 which forms the reading point and the value indicated at the level of the point is the value being detected by the instrument.

The aforementioned light source 38, which is preferably an incandescent electric lamp, is mounted in a socket 50 that is supported on the instrument case by a bracket 52. Wires 54 provide for energization of the lamp 38.

The lamp could be shielded or otherwise enclosed if so desired to increase the amount of light passing through lens 40 and also to prevent the lens and lamp from becoming soiled, if so desired. In any case it will be appreciated that the lamp is located so it does not impart undesirable heat to the instrument case. This may be done by supporting the light outside the case or it may be inside the case so arranged as to be well isolated thermally from the instrument movement and with the portion of the case containing the lamp preferably being ventilated.

Furthermore, the lamp is easily accessible for replacement without taking the instrument case apart.

It has been mentioned that the instrument is adapted for panel mounting and the manner in which the instrument is mounted on a panel will be seen in FIGURE 6 wherein it will be noted that the panel 60 is provided with an aperture 62 of a size for receiving the shield 36. Shield 36 is rectangular and the aperture in the panel is therefore rectangular and closely fits about the shield.

The instrument is secured to the panel by screws 64 passing through the panel and into threaded holes 66 provided in the front end wall 32 of the casing of the instrument.

This type of mounting is preferred where the shield 34 is retained in position on the front wall of the instrument in shielding relation to the aperture 68 by the screws 70 which also hold the shield 36 in place.

It is also possible, however, to arrange the instrument in such a manner that the instrument is secured to the panel by the same screws which hold the shield in position. This is shown in FIGURE 7 wherein the panel 72 is provided with an aperture 74 smaller than the shield 36 and the screws 76 that secure the shield to the instrument case also pass through panel 72 and retain the instrument on the panel. In the FIGURE 7 modification the screen 34 may be held in place on the instrument by a plate 78 and screws 80 which secure the plate to the instrument case in overlying relation to the edge of screen 34.

It will be understood that the instrument could be constructed of any size and that changing of the instrument size would involve principally the selection of lenses of the proper design to focus the characters of the film strip on the screen. Similarly the electrical instrument could be an instrument of any known type, i.e. an ammeter, voltmeter, watt meter, or any other electrical instrument of the indicating type.

The instrument according to the present invention is relatively simple and inexpensive to manufacture, is easy to mount on, and dismount from, a panel and is relatively simple to service, particularly, on account of the external location of the light source.

The possibility of changing the instrument from one type to another, say, from a voltmeter to an ammeter, or for changing the range of the instrument presents itself in the form of providing means for detachably connecting the film strip to its supporting structure in which case conversion of the instrument could be accomplished by changing the components in circuit therewith and then changing the film strip to conform the film strip to the instrument circuit.

The changing of the film strip could be accomplished, for example, by retaining the film strip on the supporting structure therefor by the screws 82 which would permit the film strip to be replaced by another and which would also offer advantages in connection with the initial assembly of the instrument.

The instrument according to the present invention could be adapted to many different uses beyond those described above and which include use of the instrument as a control device or for providing a permanent record, or combinations of the several functions that have been described.

Figure 8:
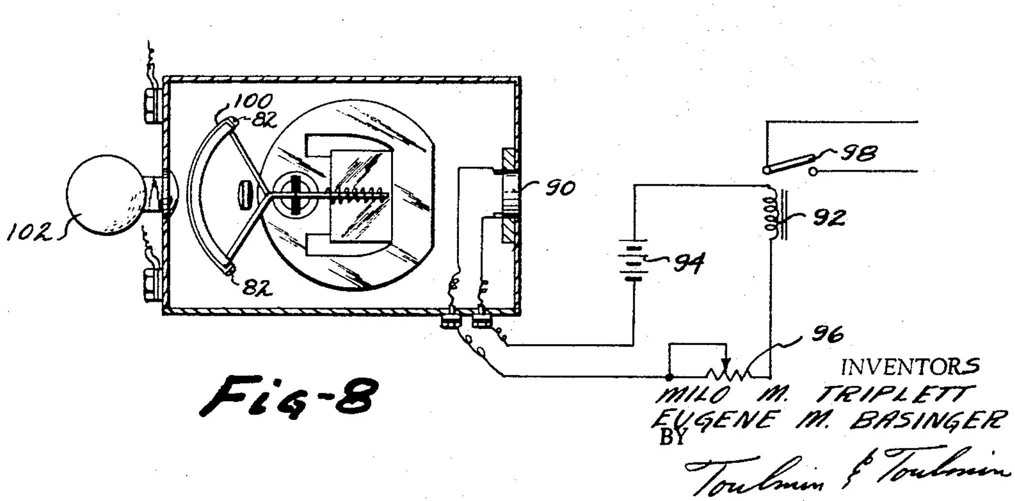
FIGURE 8 is a view like FIGURE 4 but shows how a light sensitive element could be controlled by the instrument.

Some of the additional uses of the instrument are illustrated in FIGURES 8 through 16. In FIGURE 8 there is shown an arrangement whereby the instrument exercises a control function by causing the opening and closing of a relay. Inasmuch as the instrument structure itself is substantially the same as what has been disclosed previously, no detailed description thereof will be given. In FIGURE 8, however, the screen disclosed in the other modifications is replaced by a light sensitive cell 90 which may be, for example, a photovoltaic, a photo resistive cell, a silicone light sensitive switch or any other element of this nature which is sensitive to the presence or absence of light.

The light sensitive element 90 is connected in circuit with the actuating coil of a relay 92 by way of a battery 94 and the circuit may also include an adjustable rheostat 96 whch is effective for controlling the closing point of the relay. The relay controls blade means 98 which can exercise a control function directly or which can operate through a circuit including an amplifier for exercising a control function.

Operation of the light sensitive cell 90 is effected by a special film strip 100 disposed between light source 102 and the light sensitive cell. This strip 100 is shown in FIGURE 9 wherein it will be seen to comprise a strip of variable transparency, being clear at one end as indicated at 103 and being completely opaque at the other end as indicated at 104 so that at some intermediate point it will pass sufficient light to cause the light sensitive cell 90 to bring about closing of relay 92.

The film strip could also take the form shown in FIGURE 10 wherein there is a carrier 106 having a slot 108 therein and with the carrier having edge portions 110 for slidably receiving an opaque strip 112 having an aperture 114 therein. In this arrangement the light sensitive cell will be actuated in response to a predetermined position of the strip so that an on-off type of control can be effected. The opaque strip 112 is adjustable so it can easily be replaced by another to modify the location of the control point.

Figure 11:
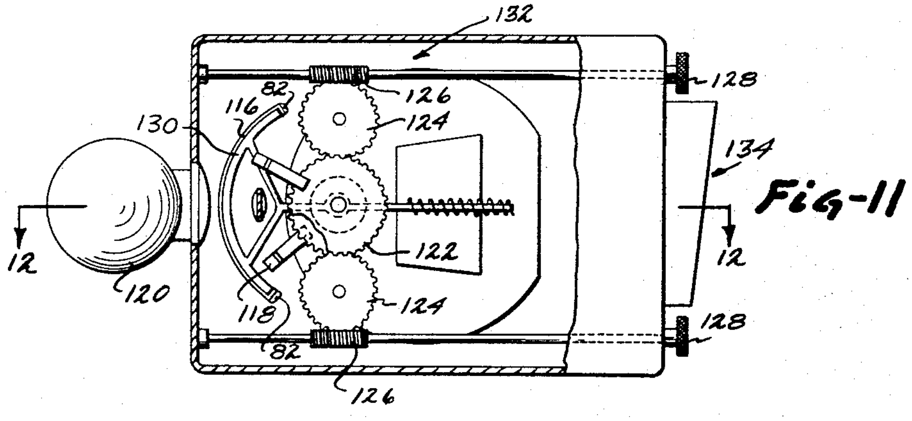
FIGURE 11 is a view like FIGURE 3 showing an instrument arranged to effect control at maximum and minimum readings.
Figure 12:
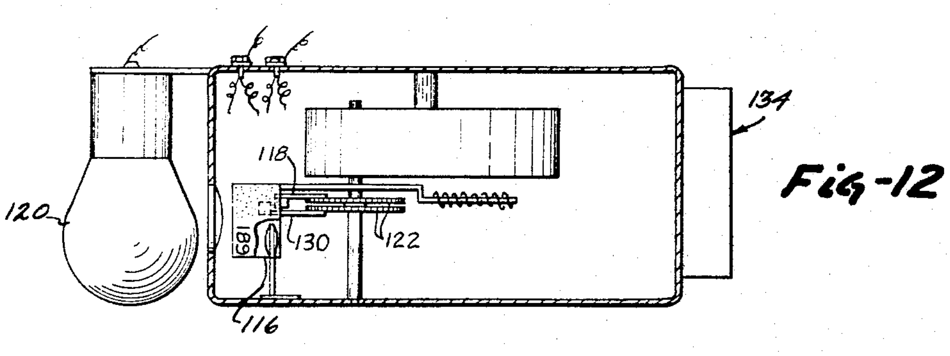
FIGURE 12 is a sectional view on line 12—12 of FIGURE 11.

The instrument also lends itself to another type of control which is illustrated in FIGURES 11 and 12 wherein the film strip 116 is of variable density such as the film strip 100 of FIGURES 8 and 9. Located behind the film strip is at least one light sensitive element 118 which is protected from the light source 120 when the darker region of film strip 116 is adjacent element 118.

Movement of the film strip, however, to a position where a less dense portion thereof is adjacent the light sensitive element will permit light to pass through the film strip and actuate the element. This light is random light within the casing of the instrument because the light sensitive element does not move with the film strip.

The light sensitive element is preferably adjustably carried within the instrument as by being mounted on an arm extending from a gear 122 and which gear meshes with another gear 124 while gear 124 is engaged by a worm 126 mounted on a shaft rotatable in the instrument casing and terminating in an adjusting knob 128 at the face of the instrument.

FIGURES 11 and 12 will also show that there can be a second light sensitive element 130 behind the film strip toward the other end thereof and having associated therewith an adjusting mechanism generally indicated at 132 which is the same as the adjusting mechanism for light sensitive element 118 and bears the same numerals with the addition of a subscript *a*. By the use of two light sensitive elements it becomes a simple matter to provide for an on-off control arrangement sensitive to predetermined low and high detected values and with the control limits readily being adjustable by adjustment of the positions of the light sensitive elements.

FIGURE 12 will also show that the control of the light sensitive elements in FIGURE 11 is effected by a region along one side edge of the film strip so that the remainder of the film strip could be employed for projecting data on the screen 134 at the front end of the instrument whereby one and the same instrument could exercise automatic control functions and at the same time give visual indications of the values being measured.

Figure 13:
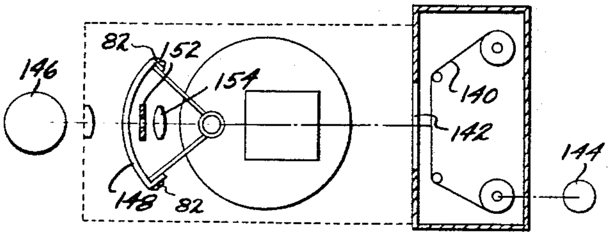
FIGURE 13 is a diagrammatic sectional view of an instrument adapted for printing a record.

FIGURE 13 shows diagrammatically an arrangement whereby a permanent record is kept of the variation of the values measured by the instrument.

In FIGURE 13 a light sensitive strip 140 is moved across the opening 142 of the instrument as by being fed from one roller to another by timer motor 144. The light source 146 is arranged to project a point of light on the light sensitive strip by a special construction of the strip 148 that is moved by the instrument movement. This strip preferably has a slot 150 formed therein as will be seen in FIGURE 14 which may extend diagonally across the strip so that the position of the light beam will move laterally across the light sensitive strip.

Figure 15:
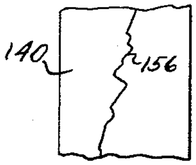
FIGURE 15 is a view of a printed chart such as might be made with the arrangement of FIGURE 13.

In order to convert the slit of light passing through slot 150 into a point, there may be a member 152 adjacent the projection lens 154 which has a slot therein extending angularly to slot 150. This will provide for substantially a point source of light that would leave a trace of the nature indicated at 156 on light sensitive strip 140 as illustrated in FIGURE 15.

Figure 16:
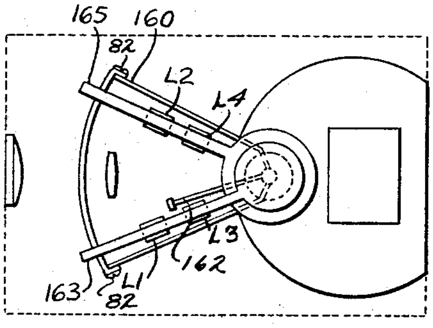
FIGURE 16 is a modified arrangement wherein the instrument is arranged to control inductance coils.
Figure 14:
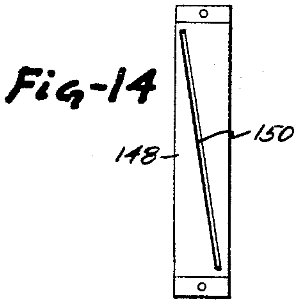
FIGURE 14 is a view showing a slotted strip for use with the FIGURE 13 arrangement.

As will be seen diagrammatically illustrated in FIGURE 16, the support 160 for the film strip could carry a metal vane 162 for cooperation with inductance coils L1, L2, L3, and L4 when moved to a certain position for effecting control functions. The inductances are mounted on adjustable levers 163 and 165 as illustrated and this permits adjustment of maximum and minimum points at which the control will operate.

The inductances can easily be connected in a control circuit such as the transistor circuit of United States Patent No. 2,967,278.

From the foregoing it will be seen that the instrument of the present invention is useful not only for displaying data on a screen but also for effecting control functions or for providing a permanent record or it could operate to carry out any combination of the functions referred to above.

It will be understood that this invention is susceptible to modification in order to adapt it to different usages and conditions; and accordingly, it is desired to comprehend such modifications within this invention as may fall within the scope of the appended claims.

We claim:

1. In an electrical instrument, a casing, an instrument movement within said casing having a movable part, a carrier mounted on said part for movement thereby, an element on the carrier having means to control the light passing therethrough, a light source external of the casing at the end, a lens in said one end of the casing through which light passes from said light source to said element, a lens in the casing on the side of the element opposite the said first mentioned lens, an aperture in the end of the casing opposite said one end to which the light passes after it has passed through the lenses and element, a viewing screen in said aperture, said element having indicia thereon along one side edge thereof that project on said screen, at least one light sensitive device within the casing behind the other side edge of said element, and the said other side edge of said element that moves over said light sensitive element having different degrees of transparency to light rays in respectively different regions thereof for variably influencing said light sensitive device as the element moves.

2. In an electrical instrument, a casing, an instrument movement within said casing having a movable part, a carrier mounted on said part for movement thereby, an element on the carrier having means to control the light passing therethrough, a light source external of the casing at one end, a lens in said one end of the casing through which light passes from said light source to said element, a lens in the casing on the side of the element opposite the said first mentioned lens, an aperture in the end of the casing opposite said one end to which the light passes after it has passed through the lenses and element, a viewing screen in said aperture, said element having indicia thereon along one side edge thereof that project on said screen, at least one light sensitive device within the casing behind the other side edge of said element, the said other side edge of said element that moves over said light sensitive element having different degrees of transparency to light rays in respectively different regions thereof for variably influencing said light sensitive device as the element moves, and means for adjusting the position of said light sensitive device along the length of said element.

3. In an electrical instrument; a casing, an instrument movement within said casing having a movable part, a carrier mounted on said part for movement thereby, an element on the carrier having means to control the light passing therethrough, a light source external of the casing at one end, a lens in said one end of the casing through which light passes from said light source to said element, a lens in the casing on the side of the element opposite the said first mentioned lens, an aperture in the end of the casing opposite said one end to which the light passes after it has passed through the lenses and element, a viewing screen inserted in said aperture, said element having indicia thereon along one side edge thereof that project on said screen, two light sensitive devices within the casing on the opposite side of the element from said light source, the other side edge of said element that moves over said light sensitive devices having different degrees of transparency to light rays in respectively different regions thereof, and means for individually adjusting the positions of said light sensitive devices in the direction of movement of said element.

References Cited

UNITED STATES PATENTS

| | | | |
|---|---|---|---|
| 333,779 | 1/1886 | Patterson | 346—108 X |
| 1,750,242 | 3/1930 | Ostrolenk | 340—201.1 |
| 2,014,960 | 9/1935 | Arey | 324—97 X |
| 2,446,674 | 8/1948 | Sproul | 324—121 X |
| 2,706,250 | 4/1955 | Donath | 324—157 X |
| 3,217,253 | 11/1965 | Welsh | 324—151 |
| 3,249,759 | 5/1966 | Sendro | 324—96 X |
| 3,274,491 | 9/1966 | Mulligan | 324—157 |

FOREIGN PATENTS

| | | |
|---|---|---|
| 858,722 | 1/1961 | Great Britain. |
| 540,345 | 3/1956 | Italy. |

OTHER REFERENCES

German printed application 1,090,872, 10/1960.

WALTER L. CARLSON, *Primary Examiner.*

R. V. ROLINEC, *Assistant Examiner.*